(12) United States Patent
Gengrinovich et al.

(10) Patent No.: US 9,643,406 B2
(45) Date of Patent: May 9, 2017

(54) PRINTHEAD LEAK DETERMINATION (71) Applicant: HEWLETT-PACKARD INDUSTRIAL PRINTING LTD, Netanya (IL)

(72) Inventors: Semion Gengrinovich, Ramat Gan (IL); Ran Vilk, Qiryat Ono (IL); Moti Balaish, Netanya (IL)

(73) Assignee: Hewlett-Packard Industrial Printing LTD., Netanya (IL)

( * ) Notice: Subject to any disclaimer, the term of this patent is extended or adjusted under 35 U.S.C. 154(b) by 0 days.

(21) Appl. No.: 15/053,742

(22) Filed: Feb. 25, 2016

(65) Prior Publication Data

US 2016/0250847 A1    Sep. 1, 2016

(30) Foreign Application Priority Data

Feb. 27, 2015   (EP) ..................... 15157009

(51) Int. Cl.
*B41J 2/045* (2006.01)
*G01M 3/28* (2006.01)
*B41J 2/14* (2006.01)

(52) U.S. Cl.
CPC ....... *B41J 2/04508* (2013.01); *B41J 2/04586* (2013.01); *B41J 2/14* (2013.01);
(Continued)

(58) Field of Classification Search
CPC  B41J 2/04508; B41J 2/04586; B41J 2/14153; B41J 2/14; B41J 2002/14354;
(Continued)

(56) References Cited

U.S. PATENT DOCUMENTS 7,174,772 B2    2/2007  Sacca
8,622,513 B2    1/2014  Steurrys
(Continued)

FOREIGN PATENT DOCUMENTS

JP    2007021955       2/2007
JP    2007290308 A     11/2007
(Continued)

OTHER PUBLICATIONS

EP Extended Search Report ~ Apptication No. 151570109.0-1567 dated Jan. 22, 2016 ~ 12 pages.
(Continued)

*Primary Examiner* — Stephen Meier
*Assistant Examiner* — Alexander D Shenderov
(74) *Attorney, Agent, or Firm* — HP Inc. Patent Department (57) ABSTRACT

In some examples, a system includes a printhead including a printer fluid nozzle, an air valve in fluid communication with a channel of the nozzle to: (1) create back pressure in the channel when the air valve is closed and printer fluid is ejected through the nozzle and (2) release back pressure in the channel when the air valve is open, an ejector to eject printer fluid through the nozzle to form a meniscus of printer fluid in the channel when the air valve is closed, a pressure sensor to measure pressure within the channel, and an indicator in electrical communication with the pressure sensor. The indicator can, for example, indicate whether there is an air leak in the channel by determining whether the pressure in the channel is within a predetermined pressure range after a predetermined idle time following the formation of the meniscus in the nozzle.

11 Claims, 6 Drawing Sheets

(52) U.S. Cl.
CPC ........ *G01M 3/2846* (2013.01); *B41J 2/14153* (2013.01); *B41J 2002/14354* (2013.01); *B41J 2202/02* (2013.01); *B41J 2202/05* (2013.01)

(58) Field of Classification Search
CPC ..... B41J 2202/02; B41J 2202/05; B05C 5/00; B05C 11/00; G01M 3/2846
See application file for complete search history.

(56) References Cited

U.S. PATENT DOCUMENTS

| | | |
|---|---|---|
| 8,919,918 B2 | 12/2014 | Igawa et al. |
| 2005/0099473 A1* | 5/2005 | Katayama ............ B41J 2/17513 347/86 |
| 2005/0206691 A1* | 9/2005 | Takata ................... B41J 2/175 347/84 |
| 2009/0174735 A1 | 7/2009 | Yamada |
| 2009/0225126 A1 | 9/2009 | Morishita |
| 2012/0081462 A1 | 4/2012 | Ring et al. |
| 2014/0132664 A1* | 5/2014 | Igawa ................. B41J 2/16532 347/30 |

FOREIGN PATENT DOCUMENTS

| | | |
|---|---|---|
| JP | 2008200910 | 9/2008 |
| WO | 2010019982 | 2/2010 |

OTHER PUBLICATIONS

HSIAO et al ~ Jetting, In-Nozzle Meniscus Motion and Nozzle-Plate Flooding in an Industrial Drop-on-Demand Print Head—2001~NIP & Digital Fabrication Conference—1 pg.

* cited by examiner

PRINTHEAD LEAK DETERMINATION

BACKGROUND

Inkjet printers can be used to print text, pictures, or other graphics by propelling droplets of printing fluid onto paper or other printer media. Such printers can include one or more printing fluid reservoirs to feed printer fluid to one or more printheads. Such reservoirs can contain different kinds of printing fluids, such as different colored printing fluids, so as to allow the printer to print in both monochrome as well as color graphics. In some printers, printheads can be removably connected to a main printer fluid line in order to allow an operator to replace, clean, or remove the printhead from the printer.

BRIEF DESCRIPTION OF THE DRAWINGS

For a detailed description of various examples, reference will now be made to the accompanying drawings in which.

NOTATION AND NOMENCLATURE

In the following discussion and in the claims, the terms "including" and "comprising" are used in an open-ended fashion, and thus should be interpreted to mean "including, but not limited to . . . ." The term "approximately" as used herein to modify a value is intended to be determined based on the understanding of one of ordinary skill in the art, and can, for example, mean plus or minus 10% of that value.

DETAILED DESCRIPTION

The following discussion is directed to various examples of the disclosure. Although one or more of these examples may be preferred, the examples disclosed should not be interpreted, or otherwise used, as limiting the scope of the disclosure, including the claims. In addition, the following description has broad application, and the discussion of any example is meant only to be descriptive of that example, and not intended to intimate that the scope of the disclosure, including the claims, is limited to that example.

Certain implementations of the present disclosure are directed to improved systems and techniques for determining air leaks in inkjet printheads. For example, in one implementation, a system can include a printhead having a nozzle, and an air valve to selectively hold and release back pressure in a channel of the nozzle. In such an implementation, the system can further include an ejector to eject printer fluid through the nozzle to form a meniscus of printer fluid in the channel when the air valve is closed. The system can further include a pressure sensor to measure pressure within the channel and an indicator to indicate whether there is an air leak in the channel. In some implementations air operator is able to determine whether there is an air leak by observing the indicator and/or by observing that the printhead is dripping printer fluid.

Certain implementations of the present disclosure can exhibit advantages compared to existing techniques for determining air leaks in inkjet printheads. For example, in some implementations, an operator can perform an air leak test in minutes rather than hours. That is, in some implementations, the air leak test can be performed using the system described herein in about 15 minutes compared to about 6 hours using existing techniques. In addition, in some implementations, an amount of printer fluid and flush fluid wasted to perform an air leak test can be significantly reduced. For example, some existing techniques can waste between 1.5 to 2 liters of ink for each color along with 20 liters of flush fluid for each color. Moreover, an air leak test can be performed using certain systems and methods described herein without relying on an external vacuum pump or separate printhead caps. Other advantages of implementations presented herein will be apparent upon review of the description and figures.

Figure 1:
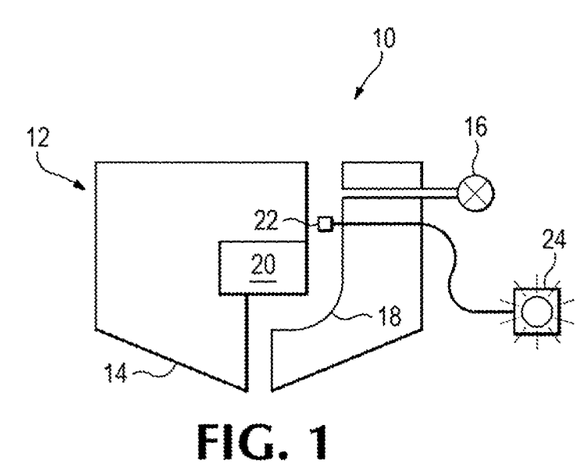
FIG. 1 is a diagram of a system, according to an example.

FIG. 1 illustrates a diagram of a system 10 that can be used to determine whether there is an air leak in a printhead. As described in further detail below, system 10 includes: (1) a printhead 12 having a nozzle 14, (2) an air valve 16 in fluid communication with a channel 18 of nozzle 14 to create back pressure in channel 18 when air valve 16 is closed and printer fluid is ejected through nozzle 14 and to release back pressure in channel 18 when air valve 16 is open, (3) an ejector 20 to eject printer fluid through nozzle 14 to form a meniscus of printer fluid in channel 18 when air valve 16 is closed, (4) a pressure sensor 22 to measure pressure within channel 18, and (5) an indicator 24 in electrical communication with pressure sensor 22 to indicate whether there is an air leak in channel 18. Each component of system 10 will be described in further detail below.

Figure 6:
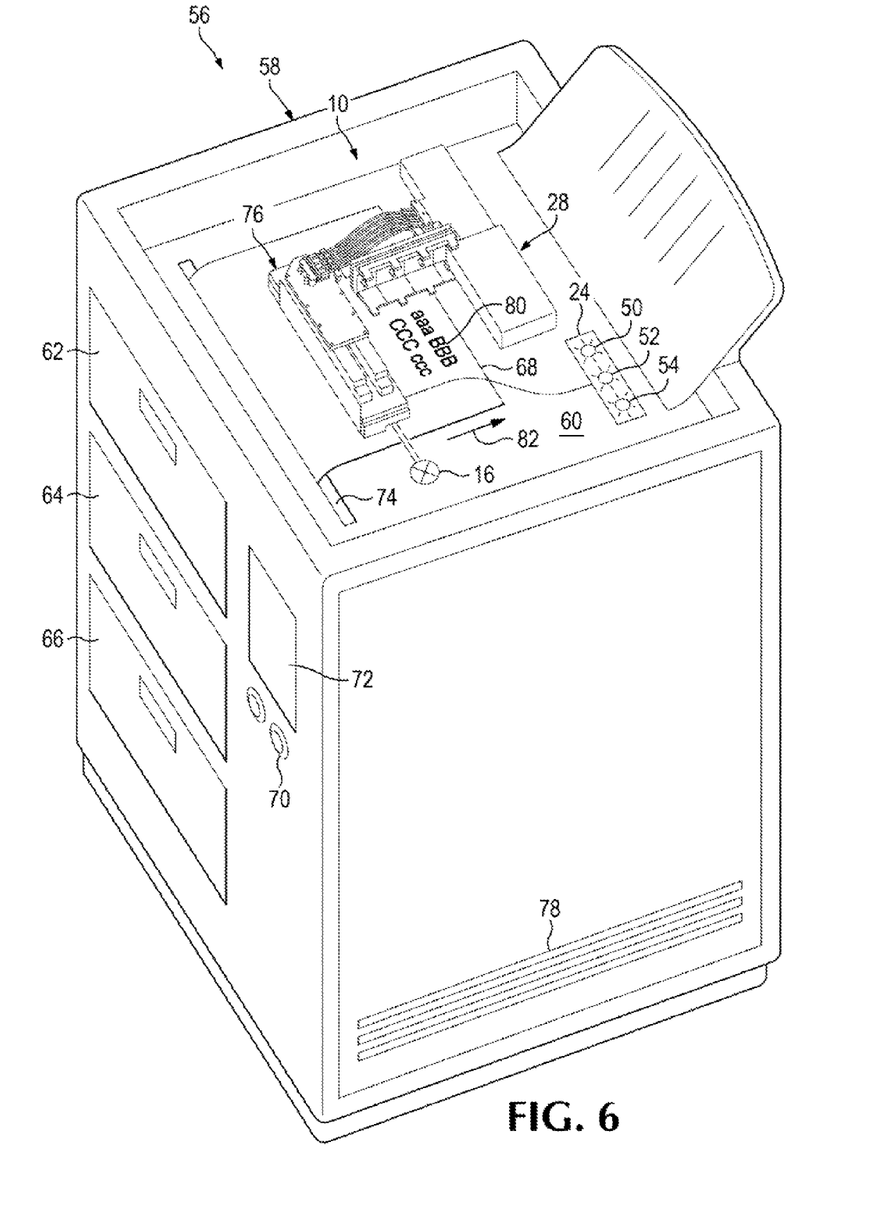
FIG. 6 is a printer incorporating a system, according to an example.

The term "printer" as used herein can, for example, refer to both standalone printers as well as other machines capability of printing. For example, the term "printer" as used herein can refer to an all-in-one device that provides printing as well as non-printing functionality, such as a combination printer, 3D printer, scanner, and fax machine. One implementation of a suitable printer for use with the system described herein is shown in FIG. 6 and is described in further detail below. In addition, the term "print" can, for example, refer to any suitable technique, such as ejecting, spraying, propelling, depositing, or the like.

The industry term "inkjet printer" is used for convenience and is not intended to refer to only ink-based printers. That is, the term "inkjet printer," can for example refer to a printer that prints any suitable printer fluid. The term "printer fluid" as used herein can, for example, refer to printer ink as well as suitable non-ink fluids. For example, printer fluid can include a pre-conditioner, gloss, a curing agent, colored inks, grey ink, black ink, metallic ink, optimizers and the like. Suitable inks for use in inkjet printers can, for example, be water based inks, latex inks or the like. In some implementations, printer fluid can be in the form of aqueous or solvent printing fluid and can be any suitable color, such as black, cyan, magenta, yellow, etc.

The term "printer media" as used herein can, for example, refer to any form of media onto which system 10 is designed to print. For example, printer media can be in the form of computer paper, photographic paper, a paper envelope, or similar paper media. Such printer media can be a standard rectangular paper size, such as letter, A4 or 11×17. It is appreciated that printer media can in some implementations be in the form of suitable non-rectangular and/or non-paper media, such as clothing, wood, or other suitable materials. For example, in some implementations, the term "printer media" as used herein can refer to a bed of build material for use in three-dimensional (3D) printing.

Nozzle 14 can be designed to control a direction or characteristics of printer fluid flow as it exits printhead 12. For example, nozzle 14 can be designed to control the rate of flow, speed, direction, mass, shape, and/or the pressure of the stream that emerges from them. As described in further detail below, in some implementations of system 10, printer media can, during printing, be moved under nozzle 14 of printhead 12. And printhead 12 can be designed to print text, pictures, or other graphics onto the printer media by propelling droplets of liquid printing fluid through nozzle 14 and onto the printer media. In some implementations, nozzle 14 can be a separate piece removably attached to printhead 12 such that a single channel 18 is formed through printhead 12 and nozzle 14. In some implementations, nozzle 14 is a single piece of material with printhead 12 and may alternatively be referred to as a nozzle portion of printhead 12.

Air valve 16 can be opened or closed in order to selectively hold and release back pressure in channel 18 of nozzle 14. For example, in some implementations, air valve 16 can be in fluid communication with channel 18 of nozzle 14 to create back pressure in channel 18 when air valve 16 is closed and printer fluid is ejected through nozzle 14 via ejector 20. In addition, air valve 16 can be in fluid communication with channel 18 of nozzle 14 to release back pressure in channel 18 when air valve 16 is opened. Air valve 16 can be directly connected to channel 18 or can be indirectly connected to channel 18 via an integrated air line channel formed in nozzle 14 and/or printhead 12 or through a separate air line channel, such as an air line tubing. In some implementations, air valve 16 can be manually opened and closed, e.g., by an operator turning a knob or other component of air valve 16. In some implementations, air valve 16 can be electronically opened and closed, e.g., via a solenoid or other mechanism. It is appreciated that air valve 16 can be designed so as to vent air if a pressure within channel 18 is outside of an acceptable range of pressures (e.g., too high or too low).

As provided above, pressure sensor 22 is to measure pressure within channel 18. Pressure sensor 22 can, for example, be in the form of an absolute pressure sensor to measure pressure relative to a vacuum, a gauge pressure sensor to measure pressure relative to atmospheric pressure, a vacuum pressure sensor to measure pressures below atmospheric pressure. Pressure sensor 22 can be designed to generate an electrical signal as a function of the pressure imposed. In some implementations, pressure sensor 22 can be in the form of a piezoelectric sensor which relies upon the piezoelectric effect in certain materials such as quartz to measure a strain upon the sensor due to pressure. In some implementations, pressure sensor 22 is in the form of a piezoresistive strain gauge which uses the piezoresistive effect of bonded or formed strain gauges to detect strain due to applied pressure. Such a pressure sensor can, for example, be in the form of Silicon (Monocrystalline), Polysilicon Thin Film, Bonded Metal Foil, Thick Film, and Sputtered Thin Film. As described in further detail below, pressure sensor 22 can, for example, be in electronic communication with another component of system 10, such as indicator 24 in order to provide actions based on the pressure readings. In some implementations, such as the implementation illustrated in FIG. 4, pressure sensor 22 is in electronic communication with a controller, which can, in some implementations, allow advanced processing of pressure sensor measurements.

As provided above, indicator 24 is in electrical communication with pressure sensor 22 to indicate whether there is an air leak in channel 18. In some implementations, indicator 24 is to indicate whether there is an air leak in channel 18 based on whether the pressure in channel 18 recorded by pressure sensor 22 is within a predetermined pressure range after a predetermined idle time following the formation of the meniscus in nozzle 14. It is appreciated that the predetermined idle time can be calculated dependent on aspects of system 10, e.g., a size of channel 18, material properties of the printer fluid, etc. In some implementations, the predetermined idle time is in a range from about 5 to about 10 minutes. For example, in a first implementation, the predetermined idle time is about 5 minutes and in a second implementation, the predetermined idle time is about 10 minutes. In some implementations, the pressure in channel 18 is to fall outside of the predetermined pressure range if the meniscus collapses due to an air leak in channel 18. The predetermined pressure range can likewise be calculated dependent on aspects of system 10, e.g., dimensions of one or more components of system 10, material properties of the printer fluid, etc. For example, in some implementations, the predetermined pressure range corresponds to substantially no change in the back pressure within channel 18 during the predetermined idle time.

In some implementations, indicator 24 can include one or more indicators to alert an operator regarding pressure readings within channel 18. For example, indicator 24 can include different color light-emitting diodes (LEDs) for different pressure levels. In such an implementation, an orange light can be used to indicate that about −250 mmH2O was reached within channel 18, a green light can indicate that pressure in channel 18 is maintained within the pre-defined range after about 5 minutes of idleness (which can thereby indicate that air bubbles have not been introduced to the line), and a red light can indicate that the pressure in channel 18 is not within the pre-defined range after about 5 minutes of idle (which can thereby indicate that air bubbles have been introduced to the line). An example of such an indicator implementation is illustrated and described below with respect to FIG. 5. Although many examples of indicator 24 refer to visual indicators such as light-emitting diodes used to indicate pressure conditions of printhead 12, it is appreciated that other forms of indicators can be used. For example, in some implementations, indicator 24 can produce an audible alert due to pressure conditions (e.g., by producing a first audible alert when a pressure has stabilized within printhead 12 and a second audible alert if the meniscus breaks).

Ejector 20 of printhead 12 can be designed to print printing fluid onto printer media. Printhead 12 can, for example, be designed to print via a thermal inkjet process. For example, in certain thermal inkjet processes, printing fluid droplets are ejected from a printhead 12 via a pulse of current that is passed through an ejector 20 in the form of a heater positioned in printhead 12. Heat from the heater causes a rapid vaporization of printing fluid printhead 12 to form a bubble, which causes a large pressure increase that propels a droplet of printing fluid onto the printer media. In some implementations, printhead 12 can be designed to print Na a piezoelectric inkjet process. In certain piezoelectric inkjet processes, a voltage is applied to an ejector 20 in the form of a piezoelectric material located in a printing fluid-filled chamber. When a voltage is applied, the piezoelectric material changes shape, which generates a pressure pulse that forces a droplet of printing fluid from the printhead onto printer the media. It is appreciated that other forms of ejector 20 can be used in accordance with the present disclosure.

As described above, the meniscus is to be formed by ejecting printer fluid via ejector 20. The exact amount of printer fluid ejected by ejector 20 can be calculated dependent on aspects of system 10, e.g., dimensions of one or more components of system 10, material properties of the printer fluid, etc. For example, in some implementations, ejector 20 is to eject approximately 1000 drops of printer fluid through the nozzle opening to form the meniscus of printer fluid. Because a meniscus is formed due to surface tension of printer fluid, it is appreciated that too much printer fluid ejected by ejector 20 may result in breaking the meniscus. In some implementations, the meniscus of printer fluid is to be formed when a back pressure in channel 18 is in a range from about −40 mmH$_2$O to about −300 mmH$_2$O. For example, in some implementations, the meniscus of printer fluid is formed with a back pressure of about −100 mmH$_2$O. An example of a stable meniscus within system 10 is illustrated in FIG. 2 below.

Figure 2:
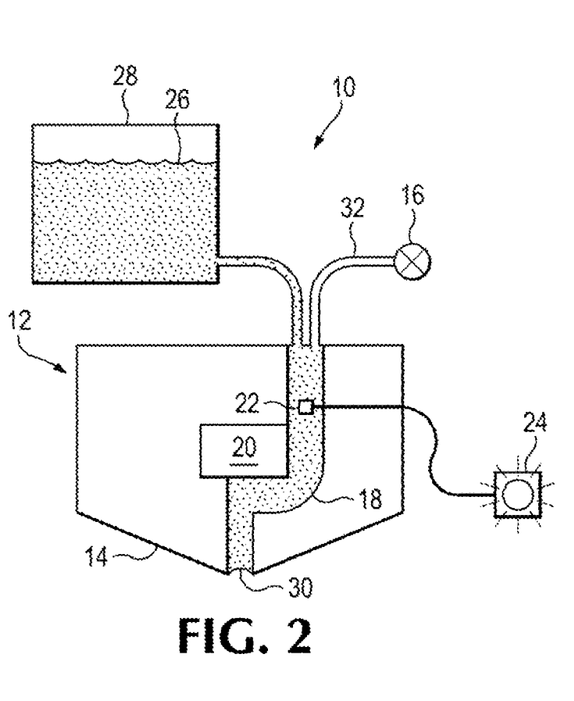
FIG. 2 is a diagram of a system, according to another example.

FIG. 2 illustrates another example of system 10 including printer fluid 26 and an attached reservoir 28. For illustration, various aspects of the system of FIG. 1 are referred to with respect to the apparatus of FIG. 2 and common reference numbers are used between the figures. However, it is appreciated that the use of common reference numbers are for illustration and are not intended to suggest that one or more aspects of the various apparatuses described herein are required in every implementation described herein. That is, suitable aspects of the systems of FIGS. 1 and 2 can be implemented in other systems described herein and vice versa. FIG. 2 further illustrates a meniscus 30 formed in printer fluid 26 at a bottom of nozzle 14 due to back pressure caused by ejection of printer fluid by ejector 20 while air valve 16 is closed. Meniscus 30 will generally be maintained in such a system as long as air valve 16 remains closed and there is no other source of air leak within printhead 12 to dissipate the back pressure within channel 18.

Reservoir 28 is designed to store a supply of printer fluid 26 for use in system 10. Reservoir 28 can be in a form suitable for long-term storage, shipment, or other handling. Reservoir 28 can, for example, be a rigid container with a fixed volume (e.g., a rigid housing), a deformable container (e.g., a deformable bag), or any other suitable container for the printing fluid supply. Reservoir 28 can be stored within a housing of system 10. For example, in some implementations, a cover or housing panel of a printer can be removed to allow a user to access and/or replace reservoir 28. In some implementations, reservoir 28 can be located outside of a housing of system 10 and can, for example, be fluidly connected to system 10 via an intake port on an exterior surface of a housing of system 10.

Printer fluid 26 can be flowed from printing fluid reservoir 28 to printhead 12 via a pump, plunger, or another suitable actuator. For example, in implementations where reservoir 28 is a flexible bag, an actuator can be used to compress reservoir 28 to force fluid 26 out of reservoir 28 and into printhead 12 or an intermediary fluid path connecting reservoir 28 and printhead 12. In some implementations, reservoir 28 can be positioned above printhead 12 so as to allow a gravitational force to assist in providing printer fluid 26 from reservoir 28 to printhead 12. Although reference is made herein to printer fluid 26 being transferred from reservoir 28 to printhead 12, it is appreciated that in some implementations, system 10 can be designed to flow printer fluid 26 from printhead 12 to reservoir 28 for storage or another desired purpose.

In this implementation of system 10, air valve 16 is in fluid communication with printhead 12 via separate tubing 32. Such tubing can allow air valve 16 to be conveniently accessible by an operator or other user, it is appreciated that such tubing can be flexible or relatively rigid in accordance with aspects of system 10, e.g., dimensions of one or more components of system 10, material properties of the printer fluid, etc. As illustrated in FIG. 2, tubing 32 and reservoir 28 can both be connected to a same portion of printhead 12 at channel 18. However, tubing 32 and reservoir 28 can connect to channel 18 at any suitable location based on the functionality of reservoir 28 and air valve 16.

Figure 3:
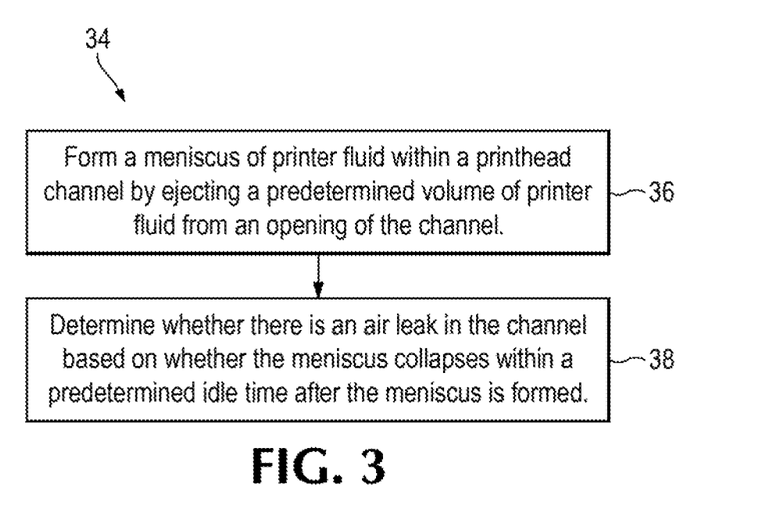
FIG. 3 is a flowchart, according to an example.

FIG. 3 illustrates a flowchart for an example method 34 relating to determining whether there is an air leak in a printhead. The description of method 34 and its component steps make reference to elements of system 10 for illustration, however, it is appreciated that this method can be used for any suitable system described herein or otherwise.

Method 34 includes a step 36 of forming a meniscus 30 of printer fluid 26 within printhead channel 18 by ejecting a predetermined volume of printer fluid 26 from an opening of channel 18. Back pressure can, for example, be formed within printhead 12 by sealing air valve 16 connected to channel 18 to allow back pressure to build in channel 18. As described above, the exact amount of printer fluid ejected by ejector 20 can be calculated dependent on aspects of system 10, e.g., dimensions of one or more components of system 10, material properties of the printer fluid, etc. For example, in some implementations, ejector 20 is to eject approximately 1000 drops of printer fluid through the nozzle opening to form the meniscus of printer fluid.

Method 34 includes a step 38 of determining whether there is an air leak in channel 18 based on whether meniscus 30 collapses within a predetermined idle time after meniscus 30 is formed. In some implementations, it can be determined whether meniscus 30 collapses by monitoring whether printhead 12 drips printer fluid 26. In some implementations, it can be determined whether meniscus 30 collapses by observing indicator 24 in electronic communication with pressure sensor 22 that dynamically measures the pressure within channel 18.

In view of the present disclosure, in some implementations, air leak testing of printhead 12 can be performed by applying a carefully controlled vacuum to printhead 12 at a level that will form and hold meniscus 30 in nozzle 14 of printhead 12. The sub pressure of system 10 caused by the vacuum can, for example, be monitored for a period of time. If due to air leakage the sub pressure of system 10 drops outside of a predetermined range, meniscus 30 will break and printhead 12 will begin dripping printer fluid 26. In some implementations, indicator 24 is provided to assist in detection of pressure or leakage within printhead 12.

Although the flowchart and description of FIG. 3 refers to a specific order of performance, it is appreciated that this order may be rearranged into another suitable order, may be executed concurrently or with partial concurrence, or a combination thereof. Likewise, suitable additional and/or comparable steps may be added to method 34 to achieve the same or comparable functionality.

Figure 4:
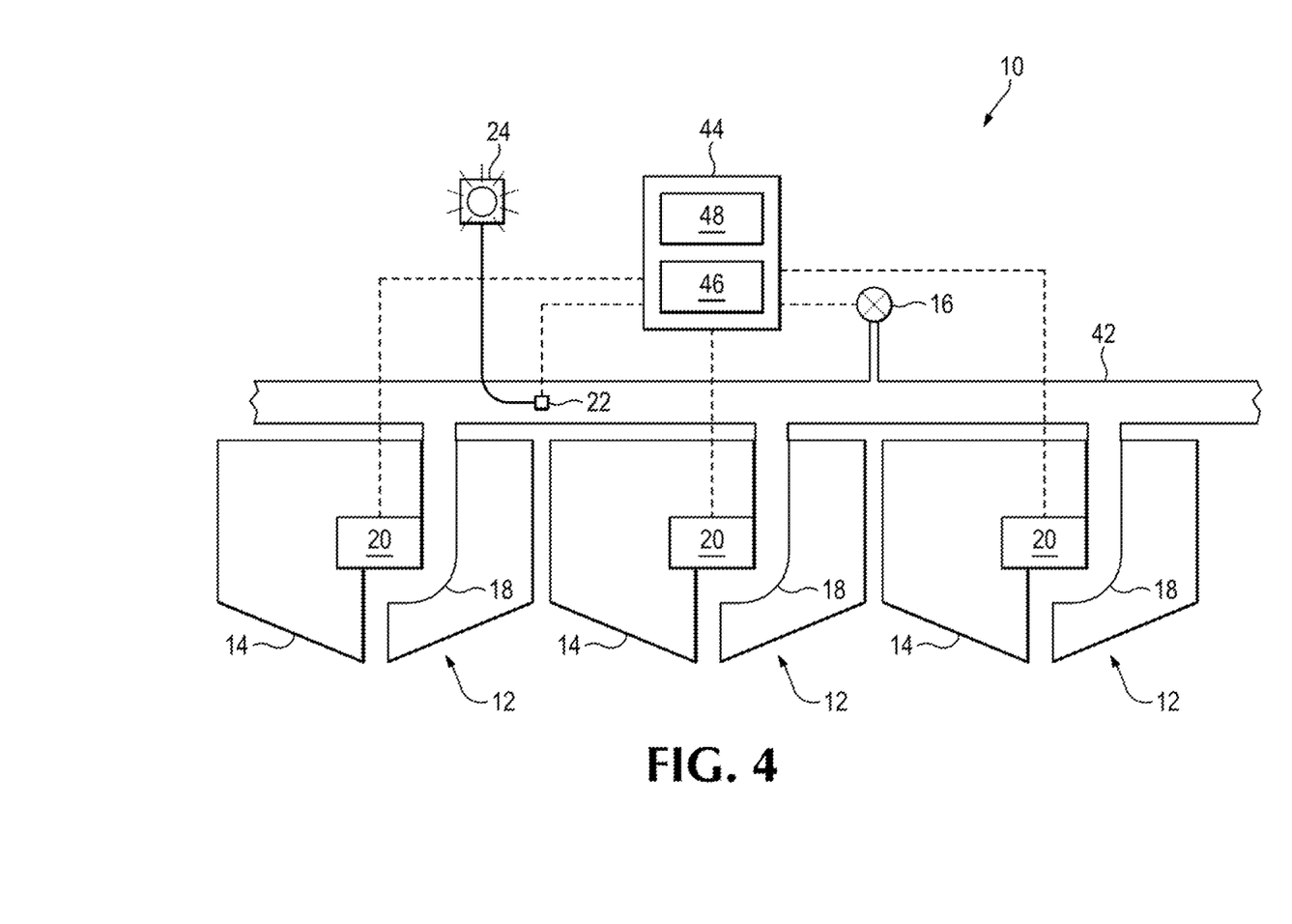
FIG. 4 is a diagram of a system, according to another example.

FIG. 4 illustrates a diagram of an example system in, the form of a printhead array 40. As described in further detail below, printhead array 40 includes a main printer fluid line 42 to circulate printer fluid through printhead array 40, an air valve 16 to, control back pressure within main printer fluid line 42, a plurality of printheads 12 in fluid communication with main printer fluid line 42, wherein each of the plurality of printheads 12 includes respective ejectors 20 to eject printer fluid through respective nozzles 14 in each printhead 12, a pressure sensor to measure back pressure within main printer fluid channel 18, a controller 44 to signal to each ejector 20 to eject printer fluid through nozzle 14 to form a respective meniscus 30 in each of the plurality of printheads when the air valve is closed, and an indicator 24 to determine and indicate whether there is an air leak in printhead array 40 based on pressure readings from pressure sensor 22 over a predetermined idle time after the respective meniscuses are formed in the plurality of printheads 12. For illustration, various aspects of the systems of FIGS. 1 and 2 are referred to with respect to the system of FIG. 4 and common reference numbers are used between the figures. However, it is appreciated that the use of common reference numbers are for illustration and are not intended to suggest that one or more aspects of the various systems described herein are required in every implementation described herein. That is, suitable aspects of the systems of FIGS. 1, 2, and 4 can be implemented in other systems described herein and vice versa.

As illustrated in FIG. 4, system 10 includes a single pressure sensor 22 and a single air valve 16 connected to main printer fluid line 42. However, these components may be replicated and/or located in other suitable locations of system 10. For example, in some implementations, separate pressure sensors 22 are located within channels 18 of each respective printhead 12 of system 10. Likewise, in some implementations, air valve 16 is fluidly connected to respective printheads 12 through alternative channels without passing through main printer fluid line 42. It is appreciated that main printer fluid line 42 can be integrated into a printer cartridge or other housing for receiving printheads 12. For example, in some implementations, main printer fluid line 42 can be a channel formed into a plastic housing of a printer cartridge. In some implementations, main printer fluid line 42 can be in the form of flexible tubing or other non-integrated fluidic connections between printheads 12.

As described above, controller 44 is to signal to each ejector 20 to eject printer fluid through its respective nozzle 14 to form a respective meniscus 30 in each of the plurality of printheads 12 when air valve 16 is closed. In some implementations, controller 44 can control alternative or additional aspects of system 10. For example, in some implementations, air valve 16 and/or pressure sensor 22 can be connected to controller 44 to allow controller 44 to open or close air valve 16 in accordance with system parameters or according to a schedule. As but one example, controller 44 can signal to air valve 16 to open if undesirably high or low pressure is sensed within printhead 12. It appreciated that the various components of controller 44 can be housed within a common housing or can be in separate housings connected via one or more signal paths. As another example, in some implementations, a memory resource 46 of controller 44 and/or a processing resource 48 of controller 44 can be in a separate housing external of a computing device connected to system 10 via a plug or another signal path.

Suitable processing resources 48 of controller 44 can, for example, be in the form of a central processing unit (CPU), a semiconductor-based microprocessing resource, a digital signal processing resource (DSP) such as a digital image processing unit, other hardware devices or processing elements suitable to retrieve and execute instructions stored in a computer-readable medium, or suitable combinations thereof. Suitable processing resources can, for example, include single or multiple cores on a chip, multiple cores across multiple chips, multiple cores across multiple devices, or suitable combinations thereof. Suitable processing resources can be functional to fetch, decode, and execute instructions as described herein. As an alternative or in addition to retrieving and executing instructions, suitable processing resources can, for example, include at least one integrated circuit (IC), other control logic, other electronic circuits, or suitable combination thereof that include a number of electronic components for performing the functionality of instructions stored on a computer-readable medium. Suitable processing resources can, for example, be implemented across multiple processing units and instructions may be implemented by different processing units in different areas of controller 44.

Suitable memory resources 46 of controller 44 can include any chine-readable storage medium for use by or in connection with an instruction execution system such as a computer/processor based system or an ASIC (Application Specific Integrated Circuit) or other system that can fetch or obtain the logic from computer-readable medium and execute the instructions contained therein. Suitable machine-readable storage mediums can, for example, be in the form of non-transitory storage mediums. The term "non-transitory" as used herein can, for example, refer to mediums that do not encompass a transitory signal but instead are made up of one or more memory resource components configured to store relevant machine-readable instructions. Such mediums can, for example, be in the form of electronic, magnetic, optical or other physical storage mediums to store information, such as computer instructions.

As used herein, the term "machine-readable storage medium" can, for example, include Random Access Memory resource (RAM), flash memory resource, a storage drive (e.g., a hard disk), any type of storage disc (e.g., a Compact Disc Read Only Memory resource (CD-ROM), any other type of compact disc, a DVD, etc.), and the like, or a combination thereof. In some implementations, mediums can correspond to a memory resource including a main memory resource, such as a Random Access Memory resource (RAM), where software may reside during runtime, and a secondary memory resource. The secondary memory resource can, for example, include a nonvolatile memory resource where a copy of machine-readable instructions are stored. It is appreciated that instructions and data can be stored on separate machine-readable storage mediums. For purposes of clarity, multiple memory resources can be identified as a single memory resource and multiple processing resources can be identified as a single processing resource.

Figure 5:
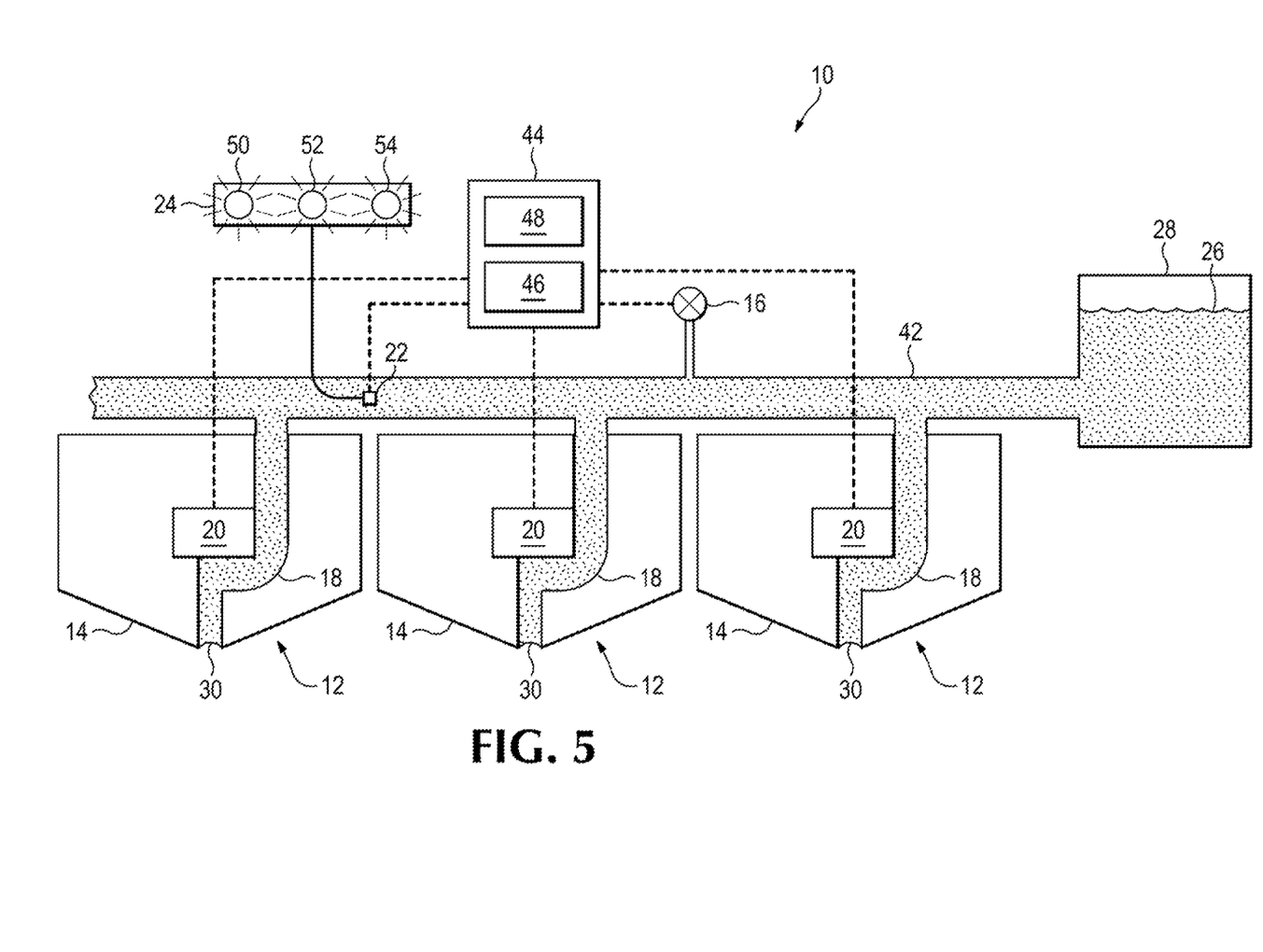
FIG. 5 is a diagram of a system, according to another example.

FIG. 5 illustrates an example printhead array 40 including printer fluid 26 and an attached reservoir 28. FIG. 5 illustrates respective meniscuses 30 formed at the bottom of respective nozzles 14 due to back pressure caused by ejection of printer fluid by respective ejectors 20 while air valve 16 is closed. For illustration, various aspects of the systems of FIGS. 1 and 2 are referred to with respect to the system of FIG. 4 and common reference numbers are used between the figures. However, it is appreciated that the use of common reference numbers are for illustration and are not intended to suggest that one or more aspects of the various apparatuses described herein are required in every implementation described herein. That is, suitable aspects of the systems of FIGS. 1, 2, and 5 can be implemented in other systems described herein and vice versa.

In this implementation, indicator 24 includes a first indicator light 50 that activates if pressure readings from pressure sensor 22 indicate that back pressure within main printer fluid line 42 was substantially maintained over a predetermined idle time. Indicator 24 further includes a second indicator light 52 that activates if pressure readings from pressure sensor 22 indicate that back pressure was not substantially maintained over the predetermined idle time. Indicator 24 further includes a third indicator light 54 that activates once a predetermined back pressure has been achieved within main printer fluid line 42.

FIG. 6 illustrates an implementation of a printer 56 including a system 10 to assist in detecting air leaks within a printhead. For simplicity, system 10 is depicted and referenced as the same system described above with respect to FIGS. 1-2 and 4-5, however it is appreciated that modifications to the system or alternative implementations of system 10 can be used. As described in further detail below, printer 56 includes a housing 58 that houses various internal parts of printer 56, a printing cavity 60 in which system 10 and other components are located, first, second, and third media trays 62, 64, and 66 for holding a printer media 68, buttons 70 to allow user input for printer 56, and a display screen 72 to display information regarding printer 56. It is appreciated that, in some implementations, printer 56 may include additional, fewer, or alternative components. As but one example, in some implementations, printer 56 may not include buttons 70 or display screen 72 and may instead be remotely controlled by an external computer or controller.

In use, printer media 68 is passed through a slot 74 of printer 56 and is then positioned under a printer cartridge 76. Cartridge 76 includes an array of printheads 12 for ejecting printer fluid onto printer media 68. Each printhead can, for example, be fluidly connected to respective printer fluid tanks to receive printer fluid from each tank. System 10 is designed for use with a fixed position print bar with a substrate-wide array of nozzles 14. In such implementations, printer media 68 can, during printing, be moved under nozzles 14 of cartridge 76. Cartridge 76 can be designed to print text, pictures, or other graphics 80 onto media 68 by propelling droplets of liquid printing fluid onto media 68. For example, when the printhead is located at the desired width and length location, the printhead can be instructed to propel one or more droplets of printing fluid onto the substrate in order to print graphic 80 onto the substrate. The printhead and/or the substrate can then be moved to another position and the printhead can be instructed to propel additional droplets of printing fluid onto the substrate in order to continue printing the graphic onto the substrate.

Housing 58 of printer 56 is designed to house various internal parts of printer 56, such as system 10, a feeder module to feed printer media through printer 56 along feed direction 82, a processor for controlling operation of printer 56, a power supply for printer 56, and other internal components of printer 56. In some implementations, housing 58 can be formed from a single piece of material, such as metal or plastic sheeting. In some implementations, housing 58 can be formed by securing multiple panels or other structures to each other. For example, in some implementations, housing 58 is formed by attaching separate front, rear, top, bottom, and side panels. Housing 58 can include various openings, such as openings to allow media trays 62, 64, and 66 to be inserted into housing 58, as well as vents 78 to allow airflow into the interior of printer 56.

Media trays 62, 64, and 66 can be used to store printer media, such as for example printer paper. Each media tray can, for example, be designed to hold the same or a different size media. For example, media tray 62 can be designed to hold standard letter-sized paper, media tray 64 can be designed to hold A4 paper, and media tray 66 can be designed to hold 11×17 paper. It is appreciated that system 10 can be used in printers with only a single media tray or in some implementations, with no media trays.

Printer 56 can include one or more input devices to send operator inputs printer 56. For example, as depicted in FIG. 6, such input devices can include buttons 70, which can, for example, be designed to allow an operator to cancel, resume, or scroll through print jobs. Buttons 70 can also be designed to allow an operator to view or modify printer settings. It is appreciated that in some implementations, printer 56 can be remotely controlled by a remote computer or operator and may not include buttons 70 or other user inputs.

Printer 56 can include one or more output devices to provide output information from printer 56 to an operator. For example, as depicted in FIG. 6, such an output device can be in the form of a display screen 72 connected to a processor to display information regarding printer 56, such as information regarding a current or queued print job, information regarding settings of printer 56, or other information. It is appreciated that printer 56 may include other types of output devices to convey information regarding printer 56, such as a speaker or other suitable output device.

In some implementations, display screen 72 and buttons 70 can be combined into a single input/output unit. For example, in some implementations, display screen 72 can be in the form of a single touchscreen that both accepts input and displays output. In some implementations, printer 56 does not include any input/output units and is instead connected to another device or devices for receiving input and sending output. For example, in some implementations, printer 56 can interface with a remote computer over the internet or within an internal network. The remote computer can, for example, receive input from a keyboard or other suitable input device, and output information regarding printer 56 via a monitor or other suitable output device.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described. Thus, features described with reference to one or more implementations can be combined with other implementations described herein. It is further appreciated that the choice of materials for the parts described herein can be informed by the requirements of mechanical properties, temperature sensitivity, moldability properties, or any other factor apparent to a person having ordinary skill in the art. For example, one more of the parts (or a portion of one of the parts) can be made from suitable plastics, metals, and/or other suitable materials.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A system comprising:
a printhead including a printer fluid nozzle;
an air valve in fluid communication with a channel of the nozzle to: (1) create back pressure in the channel when the air valve is closed and printer fluid is ejected through the nozzle and (2) release back pressure in the channel when the air valve is open;

an ejector to eject printer fluid through the nozzle to form a meniscus of printer fluid in the channel when the air valve is closed;

a pressure sensor to measure pressure within the channel;

an indicator in communication with the pressure sensor, wherein the indicator is to indicate whether there is an air leak in the channel by determining whether the pressure in the channel is within a predetermined pressure range after a predetermined idle time following the formation of the meniscus in the nozzle; and a printer fluid reservoir, where the printhead is a member of a plurality of printheads that receive printer fluid distributed from the printer fluid reservoir via a main line.

2. The system of claim 1, wherein the meniscus of printer fluid is formed with a back pressure can range from about −40 mmH2O to about −300 mmH2O.

3. The system of claim 1, wherein the meniscus of printer fluid is formed with a back pressure of about −100 mmH2O.

4. The system of claim 1, wherein the predetermined idle time can range from 5 minutes to 10 minutes.

5. The system of claim 1, wherein the printer fluid is printer ink.

6. The system of claim 1, wherein the ejector is to eject approximately 1000 drops of printer fluid through the nozzle opening to form the meniscus of printer fluid.

7. The system of claim 1, wherein the pressure in the channel is to fall outside of the predetermined pressure range if the meniscus collapses due to an air leak in the channel.

8. The system of claim 1, wherein the predetermined pressure range corresponds to substantially no change in the back pressure within the channel during the predetermined idle time.

9. The system of claim 1, wherein the meniscus is to be formed by ejecting the printer fluid via the ejector and not through an external vacuum pump.

10. A printhead array comprising:

a main printer fluid line to circulate printer fluid through the printhead array and to interface with a plurality of printheads in fluid communication with the main printer fluid line, wherein each of the plurality of printheads to be interfaced with the main printer fluid line are to include an ejector to eject printer fluid through a respective nozzle in each printhead and a channel of the nozzle;

an air valve in fluid communication with each channel to: (1) create back pressure in the channel when the air valve is closed and printer fluid is ejected through the nozzle and (2) release back pressure in the channel when the air valve is open;

a pressure sensor to measure Pack pressure within the channels;

a controller to signal to each ejector to eject printer fluid through the nozzle to form a respective meniscus in each of the plurality of printheads when the air valve is closed; and an indicator to determine and indicate whether there is an air leak in the channel by determining whether the pressure in the channels is within a predetermined pressure range after a predetermined idle time following the formation of the respective meniscuses in the nozzles.

11. The printhead array of claim 10, wherein the indicator includes a first indicator light that activates if pressure readings from the pressure sensor indicate that the back pressure was substantially maintained over the predetermined idle time; and wherein the indicator includes a second indicator light that activates if pressure readings from the pressure sensor indicate that the back pressure was not substantially maintained over the predetermined idle time.

* * * * *

UNITED STATES PATENT AND TRADEMARK OFFICE
CERTIFICATE OF CORRECTION

| | | |
|---|---|---|
| PATENT NO. | : 9,643,406 B2 | |
| APPLICATION NO. | : 15/053742 | |
| DATED | : May 9, 2017 | |
| INVENTOR(S) | : Semion Gengrinovich et al. | |

It is certified that error appears in the above-identified patent and that said Letters Patent is hereby corrected as shown below:

In the Claims

In Column 12, Line 16 approx., in Claim 10, delete "Pack" and insert -- back --, therefor.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*